(12) United States Patent
Tedder et al.

(10) Patent No.: US 10,775,132 B2
(45) Date of Patent: Sep. 15, 2020

(54) WIRELESS HOLSTER

(71) Applicant: Tedder Industries, LLC, Post Falls, ID (US)

(72) Inventors: Thomas Tedder, Post Falls, ID (US); Silas Van Natter, Post Falls, ID (US)

( * ) Notice: Subject to any disclaimer, the term of this patent is extended or adjusted under 35 U.S.C. 154(b) by 66 days.

(21) Appl. No.: 16/278,907

(22) Filed: Feb. 19, 2019

(65) Prior Publication Data

US 2019/0257616 A1    Aug. 22, 2019

Related U.S. Application Data

(60) Provisional application No. 62/632,430, filed on Feb. 20, 2018.

(51) Int. Cl.
| | |
|---|---|
| *F41C 33/02* | (2006.01) |
| *H04W 4/80* | (2018.01) |
| *H04W 68/00* | (2009.01) |
| *F41C 33/04* | (2006.01) |

(52) U.S. Cl.
CPC .............. *F41C 33/029* (2013.01); *H04W 4/80* (2018.02); *H04W 68/005* (2013.01); *F41C 33/0263* (2013.01); *F41C 33/041* (2013.01); *F41C 33/048* (2013.01)

(58) Field of Classification Search
CPC .. F41C 33/029; F41C 33/0263; F41C 33/041; F41C 33/048; H04W 4/80; H04W 68/005
See application file for complete search history.

(56) References Cited

U.S. PATENT DOCUMENTS

2019/0137215 A1\* 5/2019 Bernkrant ............... F41C 33/04

\* cited by examiner

*Primary Examiner* — Corey N Skurdal

(57) ABSTRACT

Representative implementations of devices and techniques provide a communication system integrated with or coupled to a holster for an implement (such as a handgun, or other tool, or the like). The communication system includes a wireless transceiver capable of communicating with one or more remote computing devices (such as a mobile device, e.g., smartphone, smart watch, tablet, etc.) via one or more wireless technologies (e.g., WiFi, Bluetooth, cellular, near-field communication, etc.). In various embodiments, the communication system communicates directly with a remote computing device or communicates with the remote computing device via a network, such as a WiFi network, the Internet, a cellular network, or another network configured for wireless communication.

21 Claims, 5 Drawing Sheets

WIRELESS HOLSTER

PRIORITY CLAIM AND CROSS-REFERENCE TO RELATED APPLICATION

This application claims the benefit under 35 U.S.C. § 119(e)(1) of U.S. Provisional Application No. 62/632,430, filed Feb. 20, 2018, which is hereby incorporated by reference in its entirety.

BACKGROUND

Implements, such as tools, weapons, and the like, may be temporarily encased in a carrier (such as a holster, for instance) for protection of the implement and/or the user, while providing access to the implement. For example, a carrier may allow a user to conveniently carry the implement, safely retaining the implement until needed. When the implement is to be used, the user may withdraw the implement from the carrier, and then return it to the carrier when finished. In some cases, such as with a handgun for example, the holster may allow the user to conceal the implement, or to conceal the fact that the user is carrying the implement.

In the case of a handgun, the holster should reasonably protect the handgun and the user, and should be convenient to the user for ready use. However, the holster should also be versatile enough to be comfortably carried by the user, such as when it is worn on the person of the user for an extended length of time. The holster should also be rigid and stable enough to allow the handgun to be repeatedly drawn and re-holstered, usually with the same hand.

Remote contact with the holster or carrier can be convenient and desirable. However, remote contact techniques can be problematic to implement on a holster, due to the often extreme nature of the environments holsters can be carried or worn into, and are often subjected to. This is particularly the case with law enforcement and military applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

DETAILED DESCRIPTION

Overview

One-way or two-way remote contact with a holster can be convenient and desirable, particularly when the remote contact is via a mobile device, such as a smartphone or the like. Native functionality or loaded applications of the mobile device can be utilized to receive communications from the holster, which may be displayed at the mobile device for information or for action by the user.

Further, the received communications may trigger automated operations at the mobile device, to be carried out at the mobile device, or to be carried out by one or more electrical or electromechanical systems at the holster. For instance, the mobile device may send signals to the holster (either automatically or in response to user input), directing the electrical or electromechanical systems to carry out operations at the holster, as managed by a processor or logic control on board the holster.

Figure 1:
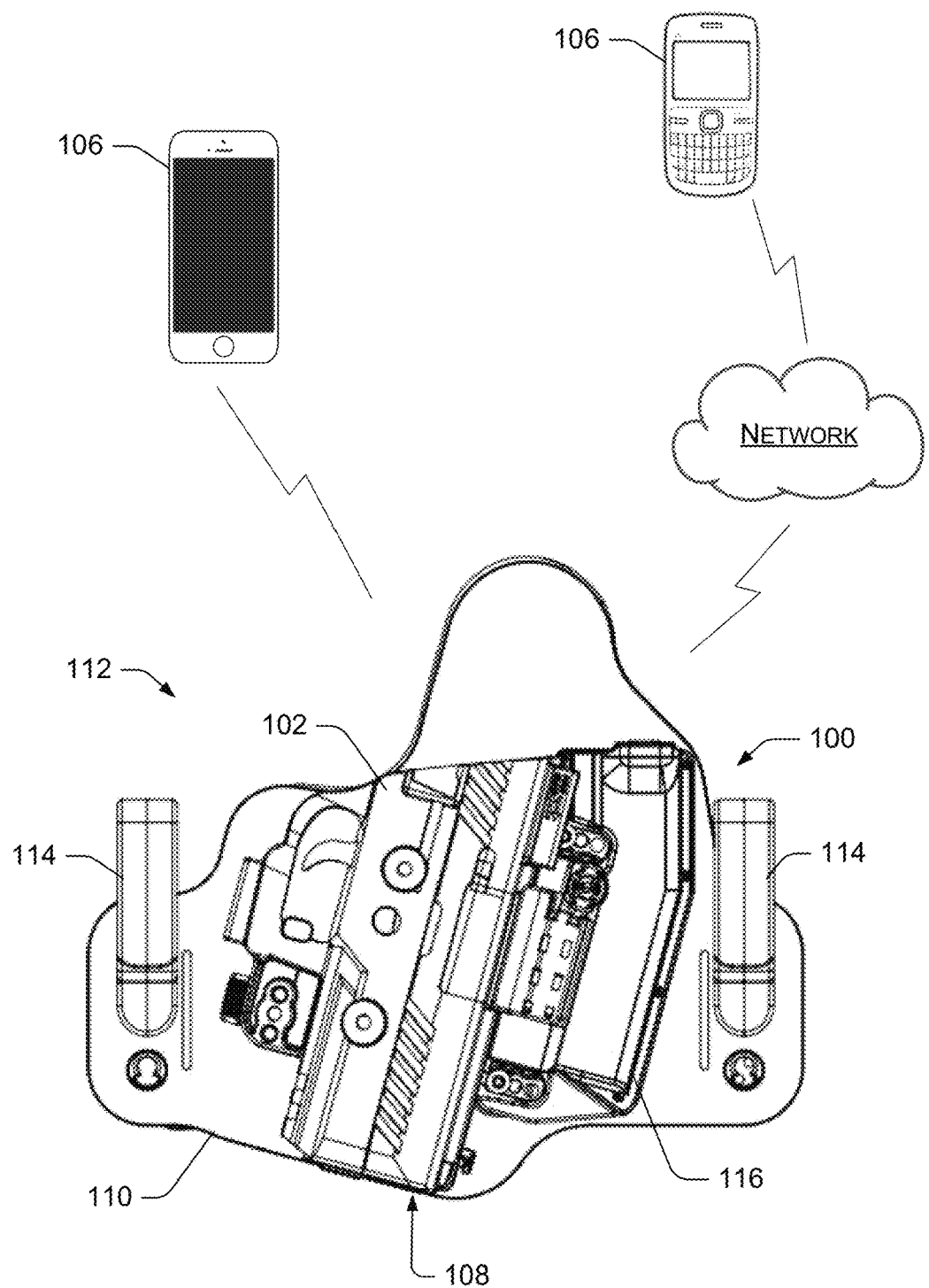
FIG. 1 shows an illustration of an example holster with a communication system, communicating with one or more remote devices, according to an implementation.
Figure 2:
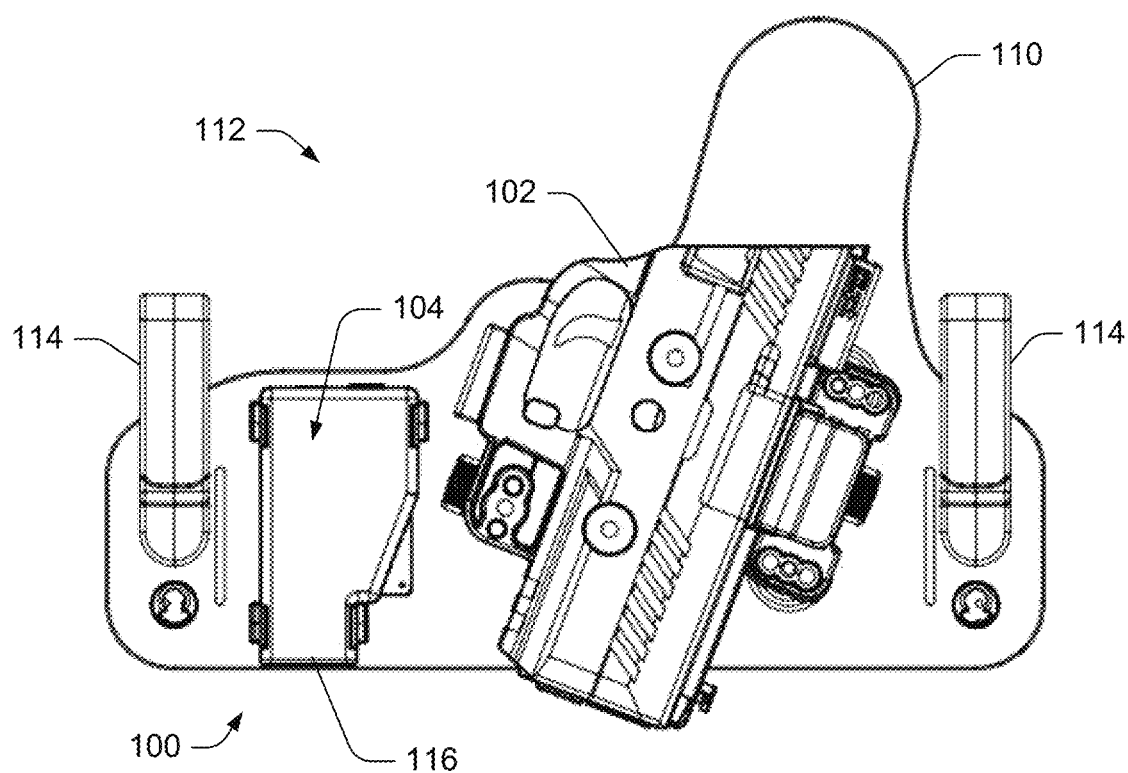
FIG. 2 shows a front view of an example holster with a communication system, according to another implementation.

Referring to FIGS. 1 and 2, representative implementations of devices and techniques provide a communication system 100 integrated with or coupled to a holster 102 for an implement (such as a handgun, or other tool, or the like). The communication system 100 includes a wireless transceiver 104 capable of communicating with one or more remote computing devices 106 (such as a mobile device, e.g., smartphone, smart watch, tablet, etc.) via one or more wireless technologies (e.g., WiFi, Bluetooth, cellular, near-field communication, etc.). In various embodiments, the communication system 100 communicates directly with a remote computing device 106 or communicates with the remote computing device 106 via a network, such as a WiFi network, the Internet, a cellular network, or another network configured for wireless communication.

In an implementation, the communication system 100 can report information to the remote computing device 106 from one or more sensors 108 (or switches, or the like) disposed on and/or within the holster 102, the holster backer 110, or other locations on the user or the holster rig. For instance, the sensors 108 may report information regarding temperature, humidity, proximity, audio, location, and so forth. In an embodiment, the communication system 100 can receive instructions from the remote computing device 106 (which may be in response to the received sensor information) and relay the instructions to various components or systems onboard the holster 102.

In some implementations, the communication system 100 may be powered by an internal and/or external direct current (DC) power supply, including a rechargeable battery for instance. In other implementations, the communication system 100 may be partly or fully powered by other sources, including solar power, an external power source, or the like.

In various embodiments, the communication system 100 is modularly coupled (interchangeably removable) to the holster 102 or the holster backer 110. For example, the communication system 100 may be coupled to or integrated into a backer 110, which may be adapted to be interchangeably coupled to various implement holsters 102 or holster shells (or the like). In the example, the communication system 100 may be a modular system adaptable to many and various carriers and carrier applications (such as various handgun holsters 102, and the like), for adding remote communication capability to the holsters 102. In other implementations, the communication system 100 may be a permanent part of a holster 102 (or other carrier).

Techniques and devices are discussed with reference to example handgun holsters illustrated in the figures. However, this is not intended to be limiting, and is for ease of discussion and illustrative convenience. The techniques and devices discussed may be applied to a holster or to any of various cases, carriers, sheaths, containers, implements, tools, tool belts, objects, and the like, and remain within the scope of the disclosure. For the purposes of this disclosure, the generic term "carrier" is used to indicate any or all of the above.

Additionally, the techniques and devices are discussed and illustrated generally with reference to an inside waistband (IWB) style holster. This is also not intended to be limiting. In various implementations, the techniques and devices may be employed with outside waistband (OWB) holsters, as well as holsters worn at the back, chest, side, thigh, or ankle of a user, holsters carried in a bag, purse, or pocket, or carried or worn on a belt, a strap, or in any other manner (e.g., attached to a vehicle, an object of furniture, another object, etc.). In alternate implementations, the techniques and devices may be employed in other ways or with other devices, systems, instruments, or the like.

Further, the shape and quantity of the communication system 100 components and holster 102 and backer 110 components illustrated in the figures may vary to accommodate various applications. In alternate embodiments, fewer, additional, or alternate components may be used and/or combined to form a communication system 100 or a wireless holster system 112 having an equivalent function and operation.

Implementations are explained in more detail below using a plurality of examples. Although various implementations and examples are discussed here and below, further implementations and examples may be possible by combining the features and elements of individual implementations and examples.

Example Embodiments

FIGS. 1-6 illustrate example embodiments of a communication system 100 for a carrier 102 (such as a handgun holster, for example), in various non-limiting configurations. The illustrations of the components of the communication system 100 and the carrier 102 as shown in FIGS. 1-6 are not intended to be restrictive, and the components may have other shapes, dimensions, orientations, and so forth, while performing the functions (or equivalent functions) described herein, and without departing from the scope of the disclosure.

Figure 3:
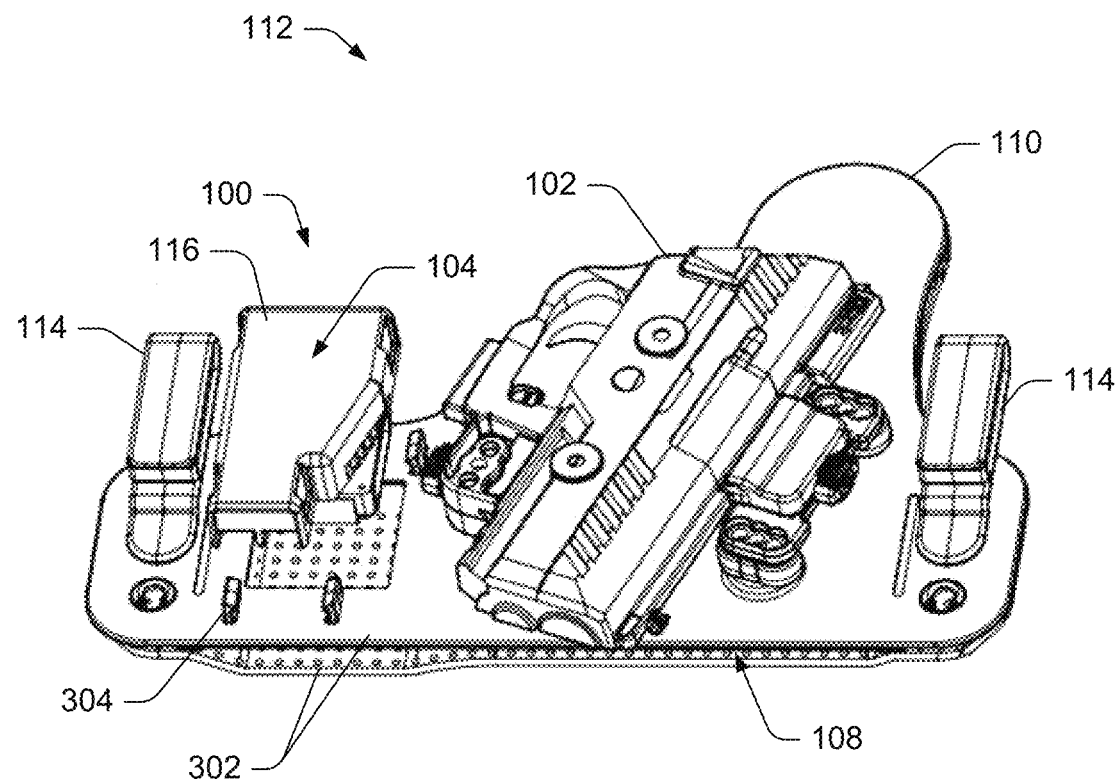
FIG. 3 shows a front perspective view of an example holster with a communication system and an electromechanical unit, according to an implementation.

FIGS. 1-3 show views of a carrier 102 with a communication system 100, according to various implementations. When combined, the communication system 100 and the carrier 102 comprise a wireless holster 112. In the illustrated examples, the carrier 102 comprises a holster shell, or the like, adapted to carry an implement (such as a handgun, for example). In various other examples, the carrier 102 may comprise any of various cases, sheaths, containers, enclosures, tool belts, and the like. In alternate implementations, the communication system 100 may be applied to a holster 102 in other configurations and remain within the scope of the disclosure.

The carrier 102 may be removably or permanently coupled to a backer 110, for instance, adapted to support the carrier 102. In some examples, the backer 110 and the carrier 102 combine to encase the implement. For instance, the backer 110 and the carrier 102 may be removably or permanently coupled together, and form an enclosure for the implement when coupled. In other examples, the carrier 102 may form an enclosure, which may be coupled to the backer 110. One or more clips 114 (or the like) may be coupled to the backer 110 or to the carrier 102 to suspend the carrier 102 from a belt, or other support object.

In various implementations, the communication system 100 includes multiple components, including a communication unit 116 having communication and control components (such as a transceiver 104, logic control or processor 502, memory 504, etc.), input/output components (such as an I/O controller 506, sensors 108, actuators 602, indicators 604, etc.), signal transmission components (such as wires, busses, conductors, antenna, etc.), and so forth. In various embodiments, the components may be packaged in different ways, with some components packaged together for convenience. In an implementation, at least a portion of the communication system 100 components can be coupled to or integrated into the backer 110 and/or the holster 102.

Referring to FIGS. 1-3, in various embodiments, the communication unit 116 is configured to be temporarily or permanently secured to a portion of the holster 102 or the holster backer 110, using one or more temporary or permanent fasteners or mounting components. (In the illustration of FIGS. 1 and 2, the communication unit 116 is mounted to the holster backer 110 using one or more mounting clips 304.) The communication unit 116 may be removable from the holster 102 (as shown in FIG. 3) for security of the unit 116, as well as for maintenance and the like. As illustrated in FIG. 3, the communication unit 116 may be user attachable and removable for user convenience.

The communication unit 116 may be plugged into one or more connections, multi-connectors, busses, or the like, to communicate with sensors 108 and/or actuators 602 at the holster 102 or the backer 110 while it is coupled to the holster 102. In some cases, the communication unit 116 may establish wired or wireless data/communication connections to one or more of the sensors 108, actuators 602, or other systems of the holster 102 when coupled to the holster 102.

In some embodiments, holstering an implement into the holster 102 or withdrawing an implement from the holster 102 activates one or more sensors 108 or systems of the holster 102, which may cause the sensors 108, actuators 602, or other systems to begin or resume communication with the communication unit 116. In the embodiments, such actions may trigger the communication unit 116 to send or receive signals from the remote computing device 106.

In an implementation, portions of the communication system 100 components may be coupled to or integrated into the backer 110. For example, as shown in FIG. 3, the backer 110 may be comprised of multiple layers 302, and one or more of the layers 302 may be part of the communication system 100. In an embodiment, the one or more layers 302 may include conductors (not shown) for powering the various components of the communication system 100 or for transmitting and receiving signals or data between the various components of the communication system 100. In one embodiment, the conductors are coupled to one or more of the layers 302. In another embodiment, the conductors are routed between layers 302. And in a further embodiment, the layers 302 include integrated conductors formed or disposed into the layers 302. Alternately, combinations of the above conductor techniques may be present in an embodiment.

The conductors may comprise metallic traces, insulated or bare wires, conductive film or sheets, metallic plates, and the like. Conductors may run from a power supply to the control board 500 of the communication system 100, for example. Additionally, conductors may run from sensors 108 to the input/output portion 506 of the communication system 100. Further, conductors may run from the input/output portion 506 to various actuators 602, electrically operated components, or electromechanical devices 402 disposed throughout the holster 102 and/or backer 110.

The conductors may protrude through one or more layers 302 of the backer 110 to make contact with the various components of the communication system 100. Terminals or other connectors (not shown) may be coupled to or integrated into the layers 302 of the backer 110 to facilitate access and connectivity with the components of the communication system 100. For instance, terminals may be molded into a layer 302 of the backer 110, glued or otherwise fastened to a layer 302, pushed through an opening in a layer 302, and so forth. Terminals may include quick-disconnect terminals, bus terminals, pin connectors, and/or various other connective components.

Figure 4:
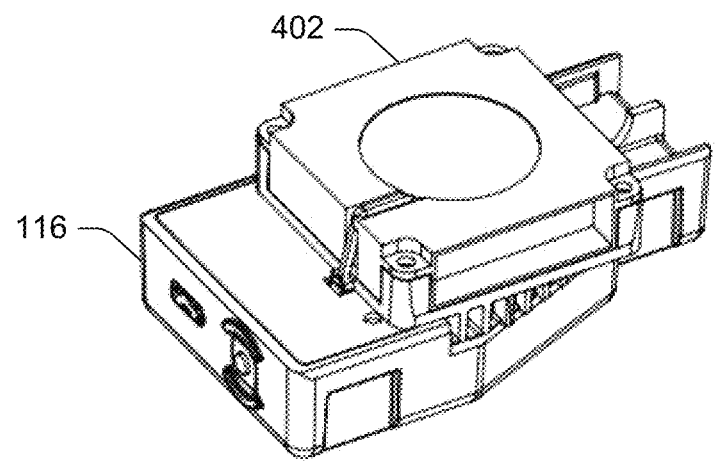
FIG. 4 shows an example communication system and electromechanical unit, which may be applied to a holster, according to an implementation.

As shown in FIG. 4, in various embodiments, the wireless holster 112 may include one or more electrical, electronic, or electromechanical components 402. In the embodiments, the communication unit 116 may be in communication with the one or more components 402, to direct the operation of the components 402. For instance, the communication unit 116 may direct the components 402 to operate or shut down, in response to instructions received at the communication unit 116 from a remote computing device 106. In other cases, the communication unit 116 may direct the operation of a component 402 based on initiated programming run on a processor or logic control 502 of the communication system 100. The program may be initiated by user input and/or instructions from a remote computing device 106.

In various implementations, the electrical, electronic, or electromechanical components 402 may include cooling fans, locking mechanisms, monitoring systems, and so forth. In the implementations, the components 402 are mounted to the holster 102 or the backer 110, and are configured to provide functionality at the holster 102 for the user. For instance, the communication system 100 may instruct example components 402 to cool the holster 102, lock the implement in the holster 102, or the like, based on instructions received at the communication system 100.

Figure 5:
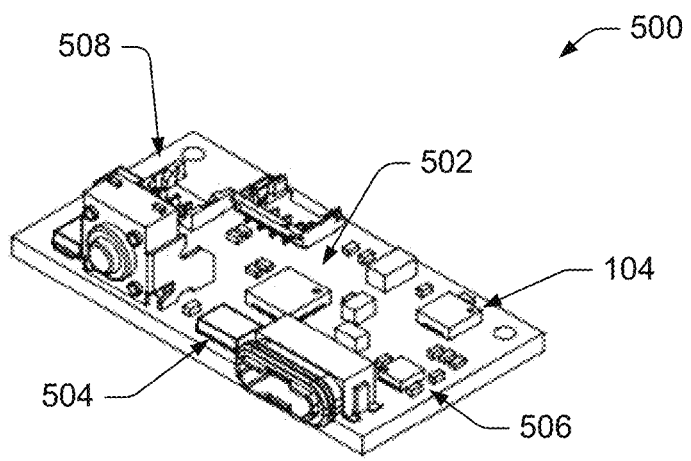
FIG. 5 shows an example control board of a communication system that may be applied to a holster, according to an implementation.

FIG. 5 shows an illustration of an example control board 500 that can be a functional part of the communication system 100. In some embodiments, the control board 500 is a part of the communication unit 116 (and may be enclosed within the enclosure of the communication unit 116). In an alternate embodiment, the control board 500 is built-in to the holster 102 or the backer 110. For instance, the control board 500 may be inserted between layers 302, or integrated into one or more layers 302 of the backer 110, or the like.

The control board 500 may have various systems and components of the communication system 100 mounted thereon, or coupled thereto. For instance, in various implementations, the control board 500 includes a processor or logic controller 502 capable of receiving (via the transceiver 104, which may also be mounted to the control board 500) and implementing instructions received from the remote computing device 106, or from a user. The control board 500 may also include memory 504, including static and/or dynamic memory, for storing programs, logic routines, collected data, communication protocols, and so forth.

Additionally, the control board 500 may include an input/output controller 506, configured to manage the flow of signals and data into and out of the communication unit 116. For instance, the I/O controller 506 may route incoming signals received at the transceiver 104 (via an antenna 508, which may also be mounted to the control board 500) to the processor 502. The I/O controller 506 may also route incoming signals from the one or more sensors 108 to the processor 502, or input from the user to the processor 502.

The I/O controller 506 routes output signals from the processor 502 to the transceiver 104 to be relayed (via the antenna 508) to the remote device 106. Further, the I/O controller 506 can route instructions from the processor 502 to the various actuators 602 and/or electrical, electronic, or electromechanical components 402, if present.

In various implementations, the individual blocks or components of the communication unit 116, and particularly components mounted to the control board 500, may be combined into integrated systems, components, or packages.

Figure 6:
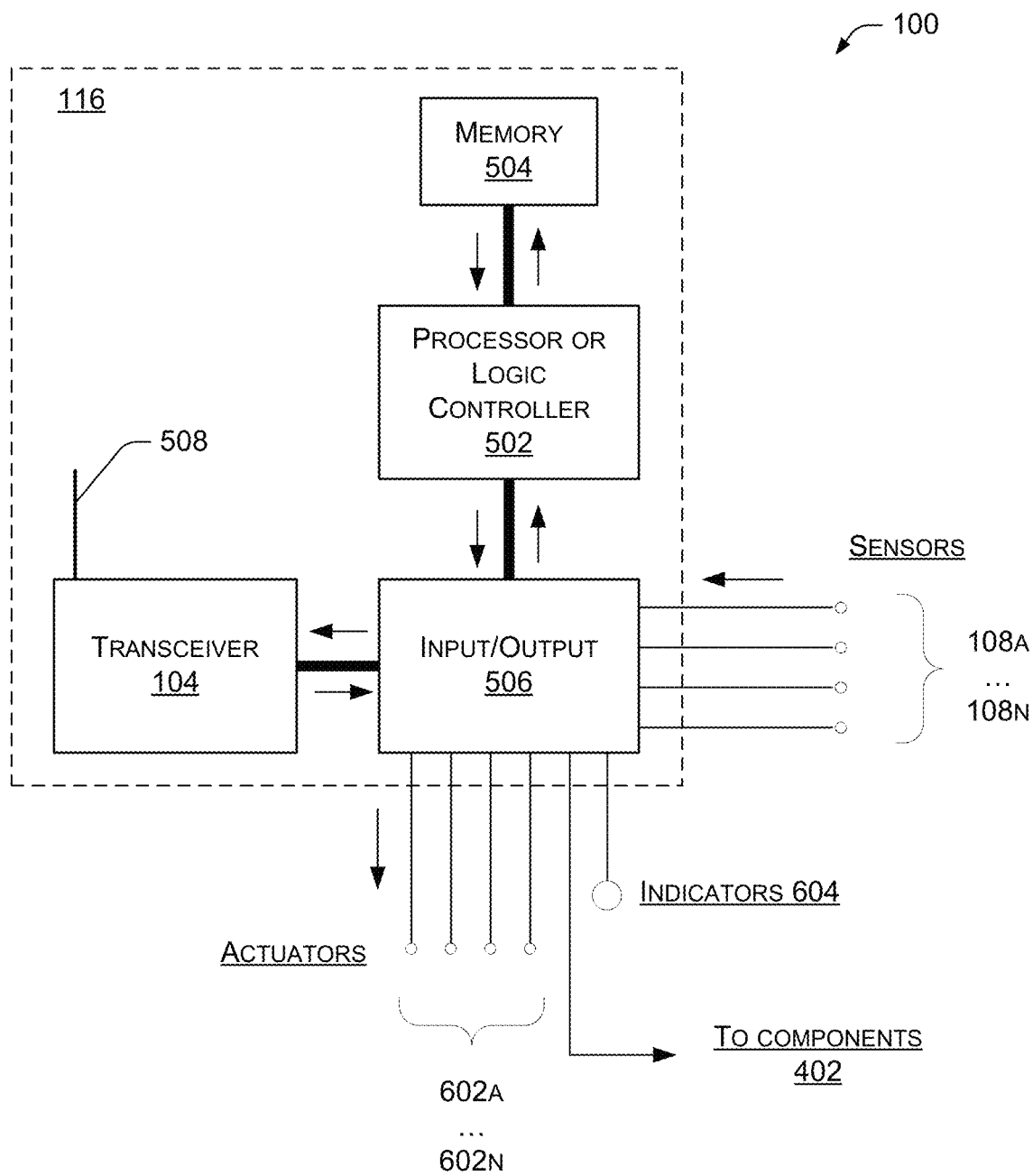
FIG. 6 shows a functional block diagram of an example communication system that may be applied to a holster, according to an implementation.

FIG. 6 shows a functional block diagram of an example communication system 100 that may be applied to a holster 102, according to an implementation. As shown in FIG. 6, the processor or logic controller 502 receives signals from the mobile device 106 through the transceiver 104 or from the sensors 108. In either case, the signals may be routed to the processor 502 using the I/O controller 506. Alternately, some signals may arrive at the processor 502 directly in some embodiments.

The processor 502 can store the signals, or a processed form of the signals (e.g., data) in the memory 504. Additionally, the processor 502 can retrieve instructions or stored data or signals from the memory 504 to perform desired operations.

The processor 502 can send signals back to the mobile computing device 106 for display, notification, or for processing at the mobile computing device 106, using the transceiver 104, via the I/O controller 506. In alternate embodiments, the communication system 100 may include one or more display or notification components (visual, audio, tactile, etc.), such as indicators 604, to provide information to the user directly, in addition to sending information to the remote computing device 106. For example, the processor 502 can send signals to one or more indicators 604 located at the holster 102 or the backer 110, also via the I/O controller 506. Indicators 604 may include visual, auditory, or tactile indicators 604 that allow the user to receive quick notifications (a light, a sound, a vibration, etc.) as desired. In other embodiments, other interfaces, or the like, may also be included.

Additionally, the processor 502 can send signals (such as instructions, for example), via the I/O controller 506, to various actuators 602 and/or electrical, electronic, or electromechanical components 402, for initiating, halting, or adjusting various functionality at the actuators 602 and/or the components 402. In some embodiments, one or more actuators 602 may be used to activate, deactivate, or adjust one or more components 402.

For instance, the actuators 602 may turn on or off a system onboard the holster 102, adjust a magnitude of a feature of the system, set off an alarm or notification, and the like. In various embodiments, an actuator 602 may include any mechanism with which the communication system 100 (e.g., the processor 502) acts on other portions of the communication system 100, portions of the holster 102, portions of the backer 110, and so forth, including electromechanical components 402, or other components or systems coupled to or integrated with the holster 102, the backer 110, and the like. Actuators 602 can include passive or active mechanisms, electrical, electronic, electromechanical, mechanical, optical, or magnetic mechanisms, solid state components, and so forth. Thus, actuators 602 can include switches, fixed or variable resistors, fixed or variable capacitors, attenuators, amplifiers, and so forth.

In various embodiments, sensors 108(A-N) and/or actuators 602(A-N) may be disposed on one or more surfaces of the holster backer 110 or within the layers of the holster backer 110. In other embodiments, sensors 108(A-N) and/or actuators 602(A-N) may be disposed on outer or inner surfaces of the holster shell 102.

In various embodiments, the sensors 108 may include mechanical and/or electrical devices such as: temperature sensors, humidity sensors, proximity sensors, audio sensors, cameras, GPS devices, motion sensors, gyroscopic sensors, accelerometers, tilt sensors, RF sensors, EM field sensors, and the like. In the embodiments, the one or more sensors 108 may be in communication with the processor 502 as directed by the user, the processor 502, and/or the remote computing device 106 as programmed or desired.

In the embodiments, the sensors 108 relay their detected information to the processor 502 via the I/O controller 506. Upon receiving the detected information from the sensor, the processor 502 may do one or more of the following: store the information in the memory 504; cause an indicator 604 to illuminate, sound, etc.; cause a component 402 or an on-board system to be activated or adjusted, either directly or through one or more actuators 602; or send a signal to the mobile device 106 via the transceiver 104.

In an embodiment, programming stored in the memory 504 (or elsewhere) or the internal logic of the processor 502 can cause the processor 502 to do one or more of the mentioned actions (or others) when the detected information is received. Additionally, upon receiving the signal at the mobile device 106, the mobile device 106 may send instructions to the processor 502 (via the transceiver 104 and the I/O controller 506) to cause the processor 502 to do one or more of the mentioned actions (or others). Further, in an embodiment, the user may input instructions to the processor 502, directly to the communication unit 116 (by activating a switch, etc.) or via the user's mobile device 106, to cause the processor 502 to do one or more of the mentioned actions (or others).

In some cases, the instructions from the remote computing device 106 are programmed to be automatic, based on information communicated to the remote computing device 106 from the processor 502. In such implementations, an automatic feedback circuit may be established to control one or more systems or conditions of the holster 102, such as controlling a heating, cooling, or communication system on-board the holster 102, or the like. In one example, the user can operate a cooling system on the holster 102 via the user's remote mobile device 106. The feedback circuit may include continuing to monitor a given condition (such as temperature or humidity, for example) using one or more of the sensors 108, and making adjustments to a cooling system, for example, based on a temperature or humidity set-point entered by the user at the mobile device 106 (for instance, using an application loaded on the device 106).

ADDITIONAL IMPLEMENTATIONS

In various implementations, the communication system 100 may provide or automate various functionality. In one implementation, the communication unit 116 includes a wireless communications booster (not shown), such as a cellphone booster, WiFi booster, or the like. In the implementation, the wireless booster of the communication unit 116 receives the ambient wireless signal and provides a "hot spot" for the user, by boosting the signal (for reception and/or transmission of the signal). In some cases, the communication unit 116 includes a more capable (e.g., greater sensitivity or selectivity, higher power, newer technology, etc.) transceiver 104 of the signal of interest than a mobile device 106 (e.g., phone, tablet, etc.) carried by the user.

In another implementation, the communication unit 116 includes a monitoring feature that is capable of receiving signals from one or more of the sensors 108 and relaying information to the remote computing device 106 and/or the display. Monitored values may include one or more of system battery level, holster 102 or ambient temperature, user heart rate, motion, various audio triggers, GPS location, whether the implement is holstered or not, and so forth.

In another implementation, the communication unit 116 includes a control system, including sensor 108 feedback and actuators 602, to control an air flow, one or more heating elements, or the like, through the holster 102. This may be used with holsters 102 that are intended to be worn next to the skin of the user, such as an inside-the-waistband (IWB) holster, or the like. Various embodiments may include cooling, heating, or other comfort control (e.g., evaporation, etc.).

In another implementation, the communication unit 116 includes a notification system that can be used with another of the user's devices. For instance, the communication unit 116 may be configured to produce an audio tone, a visual indicator, a tactile response (such as a vibration, for instance) when paired with the user's device. Notifications may include phone calls, texts, alarms, reminders, and so forth. These notifications may be useful when the user's mobile device 106 is at a location where rings, alarms, and the like are not easily detected by the user.

In another implementation, the communication unit 116 includes a security alarm feature (which may be audible or silent, and may include visual or tactile notifications at the holster 102 and/or the remote computing device 106) when the implement is removed from the holster 102 under a set of programmed circumstances. For instance, the alarm may be set to go off when the implement is removed from the holster 102 and the holster 102 is some distance from the user (e.g., the remote computing device 106, a user-worn sensor 108, etc.). In other cases, the alarm may require the entry of a code or sequence on the remote computing device 106 or the communication unit 116 prior to withdrawing the implement, or the like.

In an embodiment, the communication unit 116 can be configured to send an alert to the user's computing device 106, such as a text message, a notice on an app, an audible alarm, or the like, to notify the user that the implement has been withdrawn from the holster 102, or that an attempt to withdraw the implement is in progress. Another embodiment can include a trigger to begin an audio and/or visual recording when the implement is removed from the holster 102 (e.g., automatically or when a preset sequence has not been activated to disable the recording).

In various other implementations, other features are also contemplated as potentially being included with the communication system 100 and the holster 102. In various implementations, the communication system 100 and the holster 102 may include additional or alternate components, or have different shapes or sizes than those illustrated. The communication system 100 disclosed herein has been illustrated to be used with handgun holsters 102 and holster shells. However, the communication system 100 disclosed herein may also be used with the holders or cases of any tools or implements.

Although various implementations and examples are discussed herein, further implementations and examples may be possible by combining the features and elements of individual implementations and examples.

In various embodiments, the communication system 100, may be added to an existing arrangement (such as existing holsters 102 and holster mounting apparatus and assemblies, for example). For instance, the existing arrangements may be retrofitted with the communication system 100 or with communication system 100 components. In other embodiments, the communication system 100 may be a part of a new arrangement, such as a new holster 102, case, enclosure, or the like.

Although various implementations and examples are discussed herein, further implementations and examples may be possible by combining the features and elements of individual implementations and examples.

CONCLUSION

Although the implementations of the disclosure have been described in language specific to structural features and/or methodological acts, it is to be understood that the implementations are not necessarily limited to the specific features or acts described.

What is claimed is:

1. A holster for an implement, comprising:
a holster portion adapted to receive and to carry an implement;
an on-board electrical or electromechanical system configured to control a temperature and/or humidity of the holster;
a communication unit coupled to the holster portion, the communication unit comprising:
a transceiver adapted to wirelessly communicate with one or more wireless communication devices using one or more wireless communication technologies and protocols and to receive instructions from the one or more wireless communication devices; and
a processor or logic controller adapted to receive one or more input signals from one or more sensors at the holster portion and to control the on-board electrical or electromechanical system in response to the instructions and the one or more input signals; and
one or more sensors disposed at the holster portion and communicatively coupled to the processor.

2. The holster of claim 1, wherein the transceiver is adapted to wirelessly communicate with the one or more wireless communication devices using at least one of WiFi, Bluetooth, or cellular radio frequencies.

3. The holster of claim 1, wherein the processor or logic controller is adapted to receive the instructions from the one or more wireless communication devices via the transceiver, and to execute the instructions.

4. The holster of claim 3, further comprising one or more actuators disposed at the holster portion and communicatively coupled to the processor or logic controller and adapted to perform one or more functions at the holster when receiving a signal from the processor or logic controller based on the instructions.

5. The holster of claim 4, wherein the communication unit, the sensors, and the actuators are configured to control the on-board system of the holster via a feedback circuit, based on the instructions received from the one or more wireless communication devices.

6. The holster of claim 1, wherein the one or more sensors include one or more of: switches, temperature sensors, humidity sensors, proximity sensors, audio sensors, cameras, GPS devices, motion sensors, gyroscopic sensors, accelerometers, tilt sensors, RF sensors, and EM field sensors.

7. The holster of claim 1, wherein the one or more wireless communication devices include one or more of: a smartphone, a smart watch, and a tablet device.

8. A holster for an implement, comprising:
a holster portion adapted to receive and to carry an implement;
an on-board electrical or electromechanical cooling system coupled to the holster portion and configured to control a temperature and/or humidity of the holster;
a communication unit coupled to the holster portion, the communication unit comprising:
a transceiver adapted to wirelessly communicate with one or more wireless communication devices using one or more wireless communication technologies and protocols; and
a processor or logic controller adapted to receive one or more input signals from one or more sensors at the holster portion and to cause the on-board electrical or electromechanical cooling system at the holster portion to be adjusted in operation in response to the one or more input signals; and
one or more sensors disposed at the holster portion and communicatively coupled to the processor, the one or more sensors configured to send the one or more input signals to the processor.

9. The holster of claim 8, wherein the processor or logic controller is configured to cause the transceiver to transmit one or more notification signals to the one or more wireless communication devices in response to the one or more input signals.

10. The holster of claim 8, wherein the processor or logic controller is configured to cause the on-board electrical or electromechanical cooling system at the holster portion to be adjusted in operation based on one or more user inputs at the one or more wireless communication devices.

11. The holster of claim 8, wherein the processor or logic controller is configured to cause the on-board electrical or electromechanical cooling system at the holster portion to be adjusted in operation based on a feedback loop including the one or more input signals from one or more sensors and one or more user-input set-points.

12. A holster for an implement, comprising:
a holster portion adapted to receive and to carry an implement; and
an on-board electrical or electromechanical cooling system coupled to the holster portion and configured to control a temperature and/or humidity of the holster;
a transceiver adapted to wirelessly communicate with one or more wireless communication devices using one or more wireless communication technologies and protocols; and
a processor or logic controller adapted to receive instructions from the one or more wireless communication devices via the transceiver, and to cause the on-board electrical or electromechanical cooling system at the holster portion to be adjusted in operation in response to the instructions.

13. The holster of claim 12, further comprising one or more actuators disposed at the holster portion and communicatively coupled to the processor, the one or more actuators configured to adjust an operation of the on-board electrical or electromechanical cooling system in response to a signal from the processor.

14. The holster of claim 13, further comprising a multi-layer backer removably coupled to the holster portion and configured to support the holster portion, one or more layers of the multi-layer backer having electrical conductors integrated therein or coupled thereto, the electrical conductors electrically coupling the processor or logic controller to the one or more actuators.

15. The holster of claim 14, further comprising one or more sensors disposed at one or more of the layers of the multi-layer backer, and wherein the communication unit, the sensors, and the actuators are configured to control the on-board electrical or electromechanical cooling system of the holster via a feedback circuit, based on instructions received from the one or more wireless communication devices.

16. The holster of claim 12, wherein the processor or logic controller is configured to cause the on-board electrical or electromechanical cooling system at the holster portion to be adjusted in operation in response to user input at the one or more wireless communication devices.

17. A wireless holster for an implement, comprising:
  a holster portion adapted to receive and to carry an implement;
  a backer coupled to the holster portion and adapted to support the holster portion;
  an on-board electrical or electromechanical cooling system configured to control a temperature and/or humidity of the holster; and
  a communication unit removably coupled to the holster portion and/or the backer, the communication unit comprising:
    a transceiver adapted to wirelessly communicate with one or more mobile computing devices using one or more wireless communication technologies and protocols; and
    a processor or logic controller adapted to receive instructions from the one or more mobile computing devices via the transceiver, and to cause one or more systems coupled to the backer and the on-board electrical or electromechanical cooling system to be adjusted in operation in response to the instructions.

18. The holster of claim 17, further comprising one or more actuators disposed at the holster portion and/or the backer and communicatively coupled to the processor, the one or more actuators configured to adjust an operation of the one or more systems or the on-board electrical or electromechanical cooling system in response to a signal from the processor.

19. The holster of claim 18, wherein the backer is comprised of multiple layers, and wherein one or more of the multiple layers includes electrical conductors integrated therein or coupled thereto, the electrical conductors electrically coupling the processor or logic controller to the one or more actuators through an input/output controller.

20. The holster of claim 17, further comprising one or more sensors disposed at the backer and communicatively coupled to the processor or logic controller, the one or more sensors configured to transmit signals to the processor based on detected conditions at the wireless holster.

21. The holster of claim 17, wherein the processor or logic controller is configured to access data or program instructions from a memory device communicatively coupled to the processor or logic controller, the data or program instructions configured to cause the processor or logic controller to adjust the one or more systems coupled to the backer or the on-board electrical or electromechanical cooling system.

\* \* \* \* \*